United States Patent
Dorner et al.

(10) Patent No.: US 7,417,959 B2
(45) Date of Patent: Aug. 26, 2008

(54) AUDIO/VIDEO-CONFERENCING USING CONTENT BASED MESSAGING

(75) Inventors: Elmar Dorner, Karlsruhe (DE); Rainer Ruggaber, Paddington (AU)

(73) Assignee: SAP Aktiengesellschaft, Walldorf (DE)

( * ) Notice: Subject to any disclaimer, the term of this patent is extended or adjusted under 35 U.S.C. 154(b) by 761 days.

(21) Appl. No.: 10/671,877

(22) Filed: Sep. 29, 2003

(65) Prior Publication Data

US 2005/0068905 A1    Mar. 31, 2005

(51) Int. Cl.
H04L 12/16 (2006.01)
(52) U.S. Cl. ..................................... 370/260
(58) Field of Classification Search ................. 370/260
See application file for complete search history.

(56) References Cited

U.S. PATENT DOCUMENTS

| | | |
|---|---|---|
| 5,151,684 A | 9/1992 | Johnsen |
| 5,619,555 A | 4/1997 | Fenton et al. |
| 5,739,512 A | 4/1998 | Tognazzini |
| 5,881,315 A | 3/1999 | Cohen |
| 5,918,211 A | 6/1999 | Sloane |
| 5,923,737 A | 7/1999 | Weishut et al. |
| 6,148,338 A | 11/2000 | Lachelt et al. |
| 6,179,206 B1 | 1/2001 | Matsumori |
| 6,182,143 B1 | 1/2001 | Hastings et al. |
| 6,185,542 B1 | 2/2001 | Moran et al. |
| 6,327,576 B1 | 12/2001 | Ogasawara |
| 6,491,217 B2 | 12/2002 | Catan |
| 6,532,218 B1 * | 3/2003 | Shaffer et al. ............... 370/260 |
| 6,587,835 B1 | 7/2003 | Treyz et al. |
| 6,873,715 B2 | 3/2005 | Kuo et al. |
| 6,907,011 B1 * | 6/2005 | Miller et al. ................. 370/254 |
| 7,151,753 B2 * | 12/2006 | Chaney et al. .............. 370/261 |
| 7,269,623 B2 | 9/2007 | Neely, III et al. |

2002/0006603 A1    1/2002   Peterson et al.

(Continued)

FOREIGN PATENT DOCUMENTS

EP       0 967 558 A       12/1999

(Continued)

OTHER PUBLICATIONS

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30.pdf], pp. 67-92, XP002274908.

(Continued)

*Primary Examiner*—Rasha S Al-Aubaidi
(74) *Attorney, Agent, or Firm*—Fish & Richardson P.C.

(57) ABSTRACT

A content based messaging audio and video conferencing system provides a messaging infrastructure for multimedia and collaborative applications. The audio/video conferencing system may be implemented using a publish/subscribe infrastructure, such as a content-based messaging (CBM) infrastructure and system. Conference participants may exchange audio and/or video data streams using the CBM system. A list of contacts displays the current status of users. For example, the status of a user may be offline, online, and in a conference. The conference system uses the publish/subscribe infrastructure to provide instant state changes in the contact list using published updates to generate state messages for those users subscribing to contacts using the conference system.

29 Claims, 13 Drawing Sheets

U.S. PATENT DOCUMENTS

| | | | |
|---|---|---|---|
| 2003/0103075 A1 | 6/2003 | Rosselot | |
| 2003/0195946 A1 | 10/2003 | Yang | |
| 2003/0222762 A1* | 12/2003 | Beigl et al. | 340/5.92 |
| 2004/0054723 A1 | 3/2004 | Dayal et al. | |

FOREIGN PATENT DOCUMENTS

| | | |
|---|---|---|
| GB | 2313250 A | 11/1997 |
| GB | 2329301 A | 3/1999 |
| WO | WO 99/09490 | 2/1999 |
| WO | WO 02 01467 A | 1/2002 |
| WO | WO 02/073442 A | 9/2002 |
| WO | WO 02/091641 | 11/2002 |
| WO | WO02/091641 A | 11/2002 |
| WO | WO 2004/023430 | 3/2004 |

OTHER PUBLICATIONS

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Eugster, Patrick, et al., "Distributed Asynchronous Collections: Abstractions for Publish/Subscribe Interaction," Agilent Lab. and Lombard Odier Co., Jan. 10, 2000, pp. 1-34, XP002171795.

Shorshita, Teruji, et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

Banavar, G., et al., "An Efficient Multicast Protocol for Content-Based Publish-Subscribe Systems," Proceedings of the 19th International Conference on Distributed Computing Systems, ICDCS '99, Austin, TX, May 31-Jun. 4, 1999, International Conference on Distributed Computing Systems, Los Alamitos, CA: IEEE Computer Soc., US, May 31, 1999, pp. 262-272, XP000883611.

Segall, Bill and David Arnold, "Elvin Has Left the Building: A Publish/Subscribe Notification Service with Quenching," Distributed Systems Technology Centre, University of Queensland, Sep. 1997, XP002152244 AU, retrieved from the Internet: http://elvin.dstc.edu.au/document/papers/auug97/AUUG97.html.

THE451, "KnowNow Unveils 'N-Way' EAI over the Internet," TechTarget Network, XP002259981, retrieved from the Internet: http://searchwebservices.techtarget.com/original/Content/0.289142.sid26_gci75182.

Trianatafillou, P., et al., "Subscription Summaries for Scalability and Efficiency in Publish/Subscribe Systems," Proceedings of the 22nd International Conference on Distributed Computing Systems Workshops (ICDCSW'02), Jul. 2, 2002, pp. 619-624, XP010601590.

Gorton, I., et al., "An efficient, scalable content-based messaging system," *Proceedings of the Seventh IEEE International Enterprise Distributed Object Computing Conference*, Sep. 16, 2003, pp. 278-285, XP010659499.

Fitzpatrick, Geraldine, et al., 'Augmenting the Workaday World with Elvin' [online]. *Proceedings of ECSCW'99*, Sep. 1999, Kluwer Academy Publishers, Copenhagen, Denmark, pp. 431-451 [retrieved on Jan. 26, 2005]. Retrieved from the Internet: <URL: http://dstc.com/Resarch/Projects/EWP/Papers/ecscw99-dist.pdf>.

Gorton, Ian, et al., 'An Efficient, Scalable Content-Based Messaging System,' *Proceedings of the Seventh IEEE International Enterprise Distributed Object Computing Conference (EDOC'03)*, Sep. 16, 2003, pp. 278-285.

Padovitz, Amir, et al., 'Awareness and Agility for Autonomic Distributed Systems: Platform-Independent Publish-Subscribe Event-Based Communication for Mobile Agents,' *Proceedings of the 14th International Workshop on Database and Expert Systems Applications (DEXA '03)*, Sep. 1, 2003, pp. 669-673.

Chappell, David A., "Asynchronous Web Services and the Enterprise Service Bus," [online], [retrieved from the Internet Feb. 10, 2004: http://www.webservices.org/index.php/article/articlprint/352/-1/24/], May 6, 2002, XP00269724, 7 pgs.

Hapner, Mark, et al., "Java Message Service," [online], [retrieved from the Internet Mar. 13, 2001: http://java.sun.com/products/jms/documents.html], Nov. 9, 1999, XP002162780, 111 pgs.

* cited by examiner

AUDIO/VIDEO-CONFERENCING USING CONTENT BASED MESSAGING

TECHNICAL FIELD

The following description relates to network communications, and in particular to audio/video conferencing.

BACKGROUND

Developments in communication technology allows individuals to inexpensively communicate over long distances. In particular, conferencing systems allow groups of individuals to have real-time audio and/or video conferences despite being in different locations.

Conventional audio/video conference systems allow multiple users to connect into a central server to join a conference that is conducted by a host. However, such systems require that the participants connect to the server and that the host controls or administers the conference. If the host departs, the conference must end, or another participant must take the place of the departed host. Often, this is inconvenient in real world scenarios. However, new methods and technology continue to develop to supplement traditional audio/video conference systems.

SUMMARY

In one general aspect, a content based messaging (CBM) audio and video conferencing system provides a messaging infrastructure for multimedia and collaborative applications. The audio/video conferencing system may be implemented using a publish/subscribe infrastructure, such as a CBM infrastructure and system. Conference participants may exchange audio and/or video data streams using the CBM system. A user may initiate a conference by inviting other users to join a conference or a user may join a conference that is already in progress.

In another general aspect, a conference may be conducted by subscribing to a conference data stream of a content based messaging (CBM) network. Data conference messages are published and messages including the conference data stream corresponding to the subscription are received from the CBM network. The messages are presented to a user. The messages may include video data and/or audio data.

The received messages may be assembled into streaming video and/or audio data and presented to the user. The messages to the user may be converted from a real time transport protocol to a format required by the Java Media Framework (JMF) to present the streaming audio and/or video data to the user.

A conference may be initiated by inviting a participant connected to the CBM network to join the conference. A conference also may be initiated by inviting one or more participants connected to the CBM network to join the conference and subscribing to a conference data stream of a content based messaging CBM network associated with each participant. Initiating a conference by inviting one or more participants connected to the CBM network to join the conference may include selecting the one or more participants from a contact list of identifiers associated with each participant.

Participants may enter or leave a conference at any time. For example, users may participate in a conference that is already established. The conference is not hosted or tied to a specific participant. As a result, all conference participants are equal.

In addition, no central conference server is needed. Data may be routed through the messaging infrastructure, and audio and video data streams are replicated by the messaging infrastructure. As a result, no redundant transmission of data streams from a source is required. Conference participants may subscribe to messages that are important to them, for example, messages containing multimedia data (e.g., audio/video data) pertaining to a specific conference. Users also may subscribe to status changes of contacts in their contact list.

According to another general aspect, a content based messaging network for conducting a conference between two or more participants includes an interface to receive subscriptions to a conference data stream corresponding to the conference and to receive publishing conference data messages corresponding to the conference, a processor to compute the subscriptions, to generate messages including the conference data stream, and to send the messages to client devices corresponding to the computed subscriptions; and an output to deliver the messages. The messages may include one video data, audio data, or a combination of video and audio data.

The system also may include two or more client devices configured to generate the subscriptions and to receive the conference messages and present the messages to an associated user. Each client device is configured to assemble the received messages into streaming audio data, video data, or a combination of the two and be presented to the user. Each client device also may be configured to convert the received messages from a real time transport protocol to a format required by the Java Media Framework (JMF) to present streaming audio and/or video data to the user. Each client device is configured to receive an invitation to join the conference and to subscribe to a conference data stream of a content based messaging (CBM) network associated with each conference participant.

The interface may be configured to receive subscriptions to a status of each conference participant and the processor is configured to receive published status information and to generate status messages based on the received subscriptions.

According to another general aspect, a client device for conducting a conference comprises an interface to receive messages including a conference data stream from a CBM network; a processor to subscribe to the conference data stream received from the content based messaging (CBM) and to process the messages for presentation to a user, and a user interface to present the processed messages. The user interface is configured to present messages including video data, audio data, and/or a combination of video and audio data.

The processor also may be configured to assemble the received messages into streaming video data, streaming audio data, or a combination of the streaming audio and video data for presentation to the user. The processor also may be configured to convert received messages from a real time transport protocol to a format required by the Java Media Framework (JMF) to present streaming audio and/or video data to the user. The processor is configured to publish messages associated with the conference to the CBM network.

In another general aspect, a computer program product comprises instructions to cause a processor to subscribe to a conference data stream of a content based messaging (CBM) network; publish conference data messages; and process the conference data stream corresponding to the subscription from the CBM network for presentation to a user. The computer program product also may include instructions to process video data and audio data. The computer program product also may include instructions to assemble the received messages into streaming video data and/or streaming audio data for presentation to the user, and/or to publish messages associated with the conference to the CBM network. The computer program product also may include instructions to convert received messages from a real time transport protocol to a format required by the Java Media Framework (JMF) to present streaming audio and/or video data to the user. The computer program product also may include instructions to initiate a conference by inviting one or more participants connected to the CBM network to join the conference and/or to subscribe to a conference data stream of a content based messaging CBM network associated with each participant.

DESCRIPTION OF DRAWINGS

Like reference symbols in the various drawings indicate like elements.

DETAILED DESCRIPTION

System Overview

The following description details an audio/video conference system that provides a content based messaging CBM infrastructure for multimedia and collaborative applications. The conference system may be implemented using a publish/subscribe infrastructure that includes at least two main subsystems: a multi-user audio/video conference system and a user management system that indicates the status (e.g., offline, online, or currently in a conference) of conference system users. Each subsystem is described in further detail below.

Figure 1:
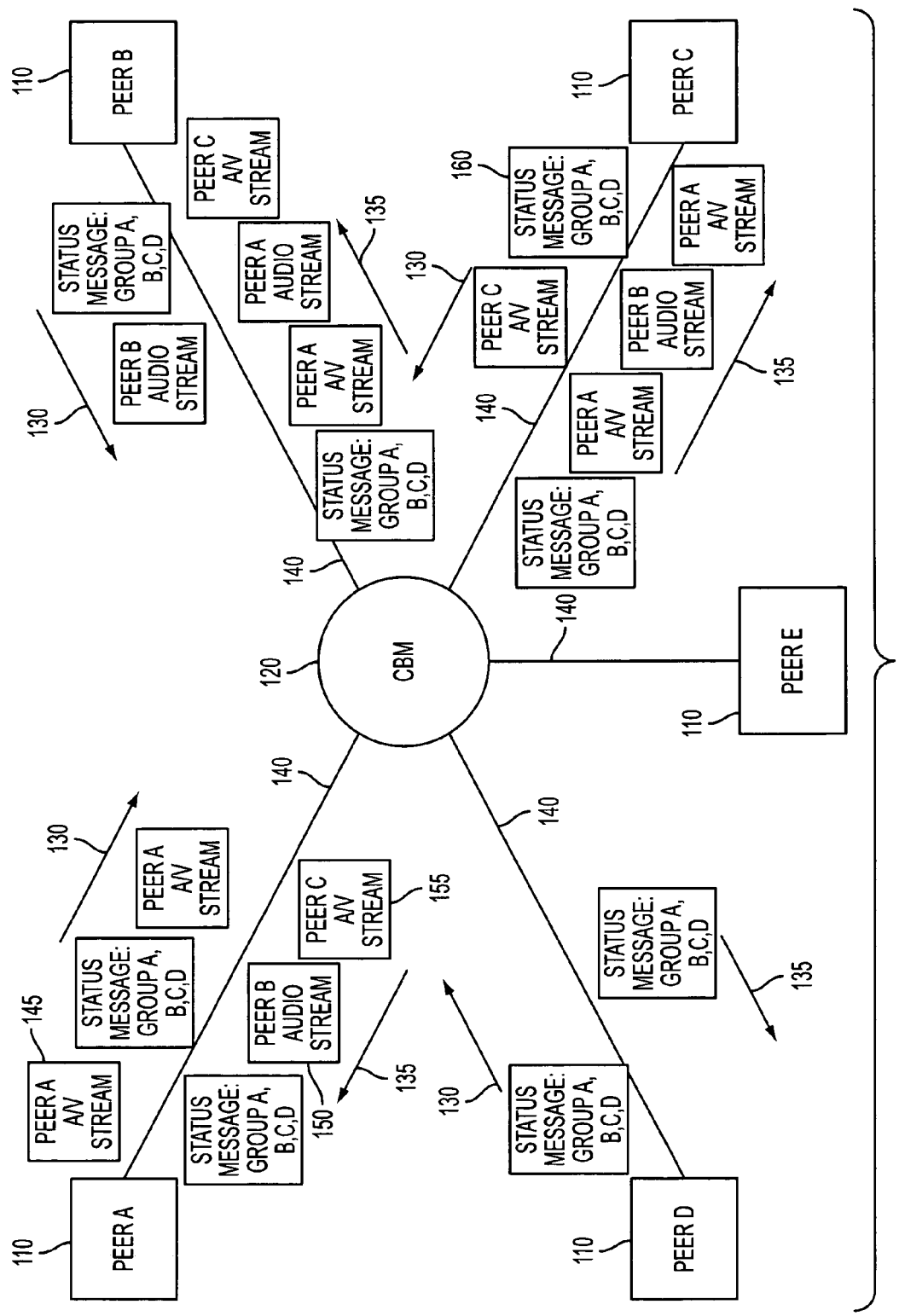
FIG. 1 is a block diagram of an exemplary audio/video conference system.

Referring to FIG. 1, a conference system 100 may include one or more client devices 110 and a CBM network 120. The client devices 110 may exchange data streams 130 and 135 with the CBM network 120 using information paths 140 to conduct audio and/or video conferences.

The client devices 110 may be operated by one or more users to access the CBM network 120. An example of a client device 110 is a general-purpose computer capable of responding to and executing instructions in a defined manner. Client devices 110 also may include a special-purpose computer, a personal computer ("PC"), a workstation, a server, a laptop, a Web-enabled phone, a Web-enabled personal digital assistant ("PDA"), an interactive television set, a set top box, an on-board (i.e., vehicle-mounted) computer, or a combination of two or more these devices capable of responding to, generating, and/or executing instructions. The client device 110 may include any number of other devices, components, and/or peripherals, such as memory/storage devices, input devices, output devices, user interfaces, and/or communications interfaces.

The client device 110 also may include one or more software applications (e.g., an operating system, a browser application, a microbrowser application, a server application, a proxy application, a gateway application, a tunneling application, and a distributed conferencing application, among others) loaded on the client device 110 to command and direct the client device 110. Applications may include a computer program, a piece of code, an instruction, or some combination thereof, for independently or collectively instructing the client device 110 to interact and operate as desired.

The applications may be embodied permanently or temporarily in any type of machine, component, physical or virtual equipment, storage medium, or propagated signal or wave capable of providing instructions to the client 110 device. In particular, the applications may be stored on a storage medium or device (e.g., a read only memory (ROM), a random access memory (RAM), a volatile/non-volatile memory, a magnetic disk, or a propagated signal) readable by the client device 110, such that if the storage medium or device is read by the client device 110, the specified step or instructions are performed.

The client device 110 also may include one or more communications interfaces that allow the client device to send and receive information using the communications paths 140 associated with the conferencing system 100.

The communications paths 140 may be configured to send and receive signals (e.g., electrical, electromagnetic, or optical) that convey or carry data streams (e.g., 130 and 135) representing various types of analog and/or digital content. For example, the communications paths 140 may be implemented using various communications media and one or more networks comprising one or more network devices (e.g., servers, routers, switches, hubs, repeaters, and storage devices). The one or more networks may include a WAN, a LAN, a broadband network, a plain old telephone service (POTS) network, a digital user line (DSL) network, an integrated services digital network (ISDN), and a synchronous optical network (SONNET), or a combination of two or more of these networks. In addition, the communications paths 140 may include one or more wireless links that transmit and receive electromagnetic signals, such as, for example, radio, infrared, and microwave signals to convey information.

The CBM conference system 100 uses a publish/subscribe technique to exchange data streams between the client devices 110. According to this technique, each client device 110 may be an information consumer or producer. As an information producer, the client device 110 uses the conferencing application to publish information (e.g., an audio/video data of a conference) to the CBM network 120. As an information consumer, the client device 110 uses the CBM conference application to register a "subscription" with the CBM network 120 to specific published information (e.g., an audio/video stream of a conference). The CBM network 120 provides notifications (i.e., messages) including the published information to those consumer client devices 110 who subscribe to the information.

The CBM conference system 100 may be implemented using a distributed conference application that includes a number of CBM conference applications running on each of the client devices 110. The CBM conference applications, in conjunction with a CBM network 120, provides CBM conferencing and CBM status services that may be provided to each of the client devices 110. The CBM conference applications encode the audio and/or video data streams and publish corresponding conference information including the audio and/or video data to the CBM network 120. The CBM applications also register subscriptions to the published conference data. The CBM conference applications receive messages corresponding to the subscriptions that include the conference data and process the received messages into a streaming data format for presentation to a user.

The CBM network 120 may include one or more data processing and distribution devices (e.g., a CBM server, associated communications media, and data transport systems). For example, the CBM network 120 may include one or more filtering CBM servers and communications interfaces (configured to communicate with communications paths 140) that receive published information (e.g., pertaining to a conference or the status of system users) and generate messages that are transmitted to the consumers who subscribe to the published information. The filtering server may compute the registered subscriptions of the client devices 110 that match the published information and send the messages including the data that are sent to the subscribing consumers based on the computed subscriptions. In particular, the published information and messages include audio and/or video content in addition to user status data, as explained in detail below.

Figure 2:
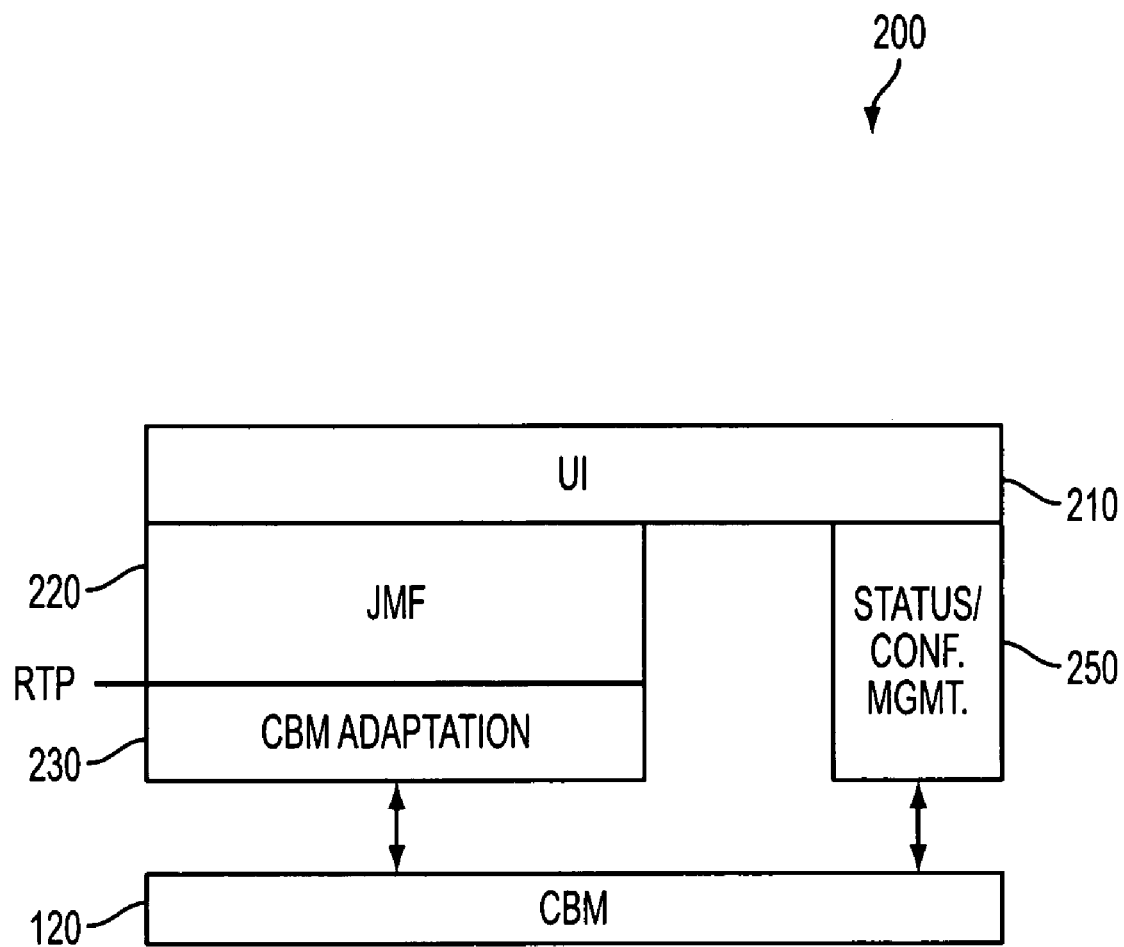
FIG. 2 is an exemplary architecture for the conference system of FIG. 1.

Referring to FIG. 2, an exemplary CBM conference architecture 200 that is similar to an open systems interconnection (ISO) architecture may be used to implement the CBM conference system 100. At the highest layer (e.g., the application layer), the distributed CBM conference application provides a user interface at a user interface layer 210. The user interface layer 210 allows a user to participate in an audio/video conference and determine the status of other users of the CBM conference system 100. The user interface layer 210 presents multimedia data streams received as messages from the CBM network 120. The user interface manages multimedia data provided from the data capture devices (e.g., a video camera and/or a microphone). The user interface layer 210 also generates and processes multimedia data streams that are published to the CBM network 120 with the aid of the intermediate layer 220 and the CBM adaptation layer 230. The user interface also provides the user with various conference management features (e.g., creating a conference, negotiating audio and/or video capabilities, joining/leaving a conference, and closing a conference), as explained below.

The intermediate layer 220 provides an interface between the user interface layer 210 and the CBM adaptation layer 230. The intermediate layer 220 may be implemented using a Java Media Framework (JMF). The JMF is an application program interface (API) that enables audio, video, and other time based media to be added to java applications and applets. The JMF uses the Real-Time Transport Protocol (RTP) (e.g., RFC 3267) for communication between distributed components designed for multimedia communications. The JMF provides an interface between the data protocols of the user interface (and its associated data capture devices) and the CBM infrastructure. The JMF converts the multimedia data stream generated by the user interface layer to data packets in JAVA using the RTP protocol for publishing to the CBM network 120. The JFM also converts RTP protocol packets received as messages from the CBM adaptation layer 230 into a multimedia data stream that is compatible with the user interface layer 210 and its data capture devices. The JMF provides both "reliable" and "unreliable" communication modes. The reliable mode is used for all multimedia stream management functions. The unreliable mode is used for transmitting the multimedia data packets to the CBM network 120.

The CBM adaptation layer 230 is responsible for mapping of the RTP encoded multimedia packets onto messages used for communication in CBM network 120. The adaptation layer 230 may be implemented in JAVA. The adaptation layer 230 also manages the necessary subscriptions for receiving published messages that include the multimedia data streams. The adaptation layer 230 is responsible for the mapping of java programming language calls onto CBM Messages. The interface that the adaptation layer implements is operable to abstract from specific network infrastructures (messaging, http, TCP/IP), so as to simplify mapping onto these network infrastructures. This abstract networking interface is defined by the JMF. The adaptation layer 230 is implemented in Java. The adaptation layer 230 takes information that is provided through the user interface by the JMF and maps this information onto CBM messages. No further encoding or decoding is necessary. The messaging infrastructure can handle messages of (basically) arbitrary length. There is a one-to-one mapping between packets from the JMF and the messages. The adaptation layer 230 also manages the connection of the client device 110 to the CBM network 120 and the necessary subscriptions to receive the appropriate messages corresponding to a conference.

The status of contacts and conference management layer 250 provides an interface between the user interface 210 and the CBM network 120 for communication and may be implemented using JAVA. The status of contacts and conference management layer 250 provides all functionality to publish and receive the presence information of contacts and conference participants. The status of contacts and conference management layer 250 layer is responsible for receiving presence updates of all configured contacts and to publish information about changes of the state of its associated user. The status of contacts and conference management layer 250 also manages the necessary subscriptions to receive the appropriate information and creates the messages to send state updates to other users. The layer 250 also handles the connection to the CBM network 120.

The CBM network 120, as it is illustrated in FIG. 2, corresponds to the relevant physical layer for implementing the CBM conference system 100. Thus, each distributed peer application in the CBM conference system 100 communicates using the CBM network 120 and its corresponding infrastructure. The CBM network 120 may be implemented using a publish/subscribe system, such as, for example, the Elvin messaging architecture developed by DSTC in Brisbane Australia. Although the examples described herein refer to Elvin, other CBM protocols and systems, such as, for example, CosNotif, JMS, Keryx, and Gryphon may be used to distribute information to the client devices 110 using their associated CBM conference applications.

Figure 3:
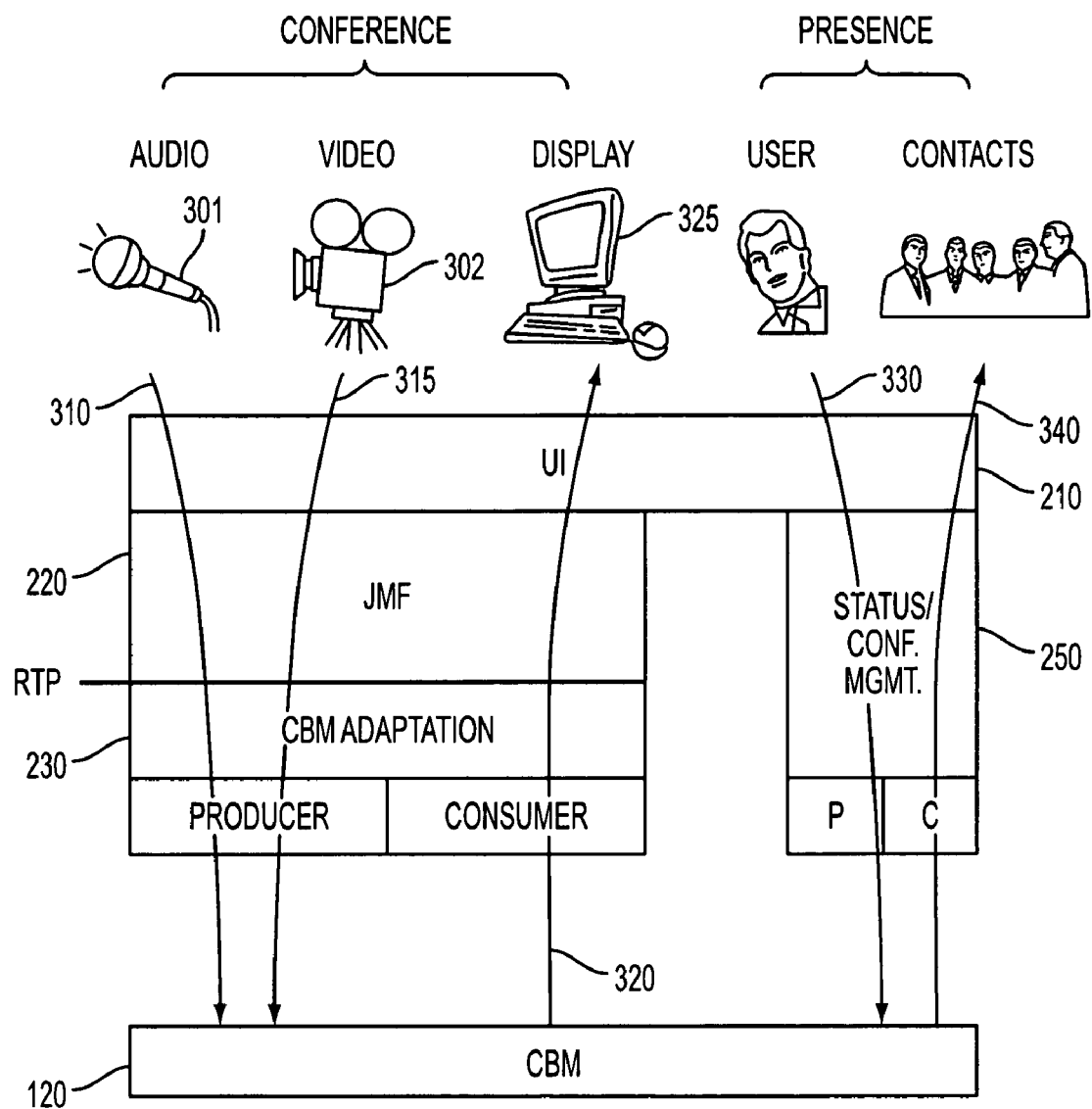
FIG. 3 illustrates the exemplary flow of data in the architecture of FIG. 2.

Referring to FIG. 3, the flow of data is shown with regard to the exemplary conference architecture of FIG. 2. An input device (e.g., a microphone 301 and/or a video camera 302) may be used to generate corresponding streams of data 310 and 315, respectively. The user interface layer 210 manages the audio 310 and/or video 315 data streams by providing any necessary encoding or processing. The audio/video data streams are provided from the user interface to the JMF 220, which encodes the data into packets using the RTP. The RTP encoded data packets are provided to the CBM adaptation layer 230 for encoding as CBM messages, and are published to the CBM network 120.

Similarly, the CBM adaptation layer 230 registers a subscription to specific conference data, and receives messages corresponding to the subscriptions for conference data (e.g., including audio/video data packets registered with the CBM network 120. The messages are decoded from RTP by the JMF 220 and provided to the user interface for presentation to the user using one or more data output devices 325 (e.g., a display and/or speakers).

The user interface layer 210 also provides user status information to the status/conference management layer 250 as data stream 330. For example, the user interface layer 210 provides the status of an associated user to the status conference management layer 250 indicating whether the user is offline, connected to the CBM network 120 and able to engage in a conference, or is online and engaged in a conference. The status conference management layer 250 publishes the status to the CBM network 120 where it is provided to other subscribing users that list the user as a contact in their contact list. The user status is published to the CBM network 120 (where it is delivered to subscribing contact lists).

The status/conference management layer 250 also receives status data streams 340 corresponding to contacts of the associated user interface's contact list to which it subscribes. The status data stream 340 is delivered to the user interface layer 210 and presented to the user in the contact list. In this way when the state of a user changes, the information is distributed to all users of the CBM conference system 100 who list a user in their contact lists.

As shown in FIG. 3, those parts of the architecture that consume messages (e.g., receive multimedia data, receive status updates) are independently responsible for creating the appropriate subscriptions with the CBM network 120. The subscriptions ensure that only required messages are sent to the corresponding CBM conference applications. As a result, the required bandwidth and the processing power needed by the CBM conference system 100 is reduced.

Referring back to FIG. 1, an example of a conference with data streams between five peer conference applications is described. According to the example, peer applications A, B, and C are engaged in a conference. Each of the peers exchanges multimedia data that are published or received as messages by the CBM network 120. The published messages are published once from each client device 110 to the CBM network 120. Each of the peer applications participating in the conference subscribe to data streams 135 including the conference specific data messages, and each conference specific message is sent to each of the subscribing participants (e.g., peer applications A, B, and C).

For example, multimedia messages 145 published from A corresponding to the conference are sent to the CBM network 120. Peers B and C subscribe to the messages in the multimedia data stream 135. The published messages from A are matched by the CBM network to B and C's conference subscriptions and are sent to both B and C. Similarly, a message 150 and a message 155 corresponding to multimedia streams published by B and C, respectively, are matched to a conference subscription by A and are delivered to A by the CBM network.

In addition, according to this example, each of the users associated with the peers A, B, C, and D is listed in the contact lists of each of the associated user interfaces. Therefore, the peers A-D publish and subscribe to status messages 160 from each of the peers to maintain the status of the each user in their associated contact list. For example, the status messages exchanged indicate that A, B, and C are in a conference and D is online (but not in a conference). In this case, D only subscribes to status messages of the users listed in its contact list (but not to any multimedia streams).

As part of this example, peer E is not in a conference and does not belong to the contacts of A, B, C, or D. As a result, peer E does not subscribe to or publish any messages.

In one implementation, a quenching feature (provided in Elvin) may be used to provide feedback information to a producer about consumers that subscribe to data published by the producer. In the CBM conference system 100, quenching may be used to determine information about peers in a conference (e.g., if any peers remain in a conference). If the quenching mechanism of a producer of a multimedia stream is activated and determines that no subscribing peers remain in a conference, the producer stops publishing the data stream as messages to the CBM network 120. The quenching mechanism ensures that whenever a new peer is added to the conference, any producers are informed to start sending the multimedia data stream associated with the conference. Quenching may be configured using the options interface, as described below.

Graphical User Interfaces

Figure 4:
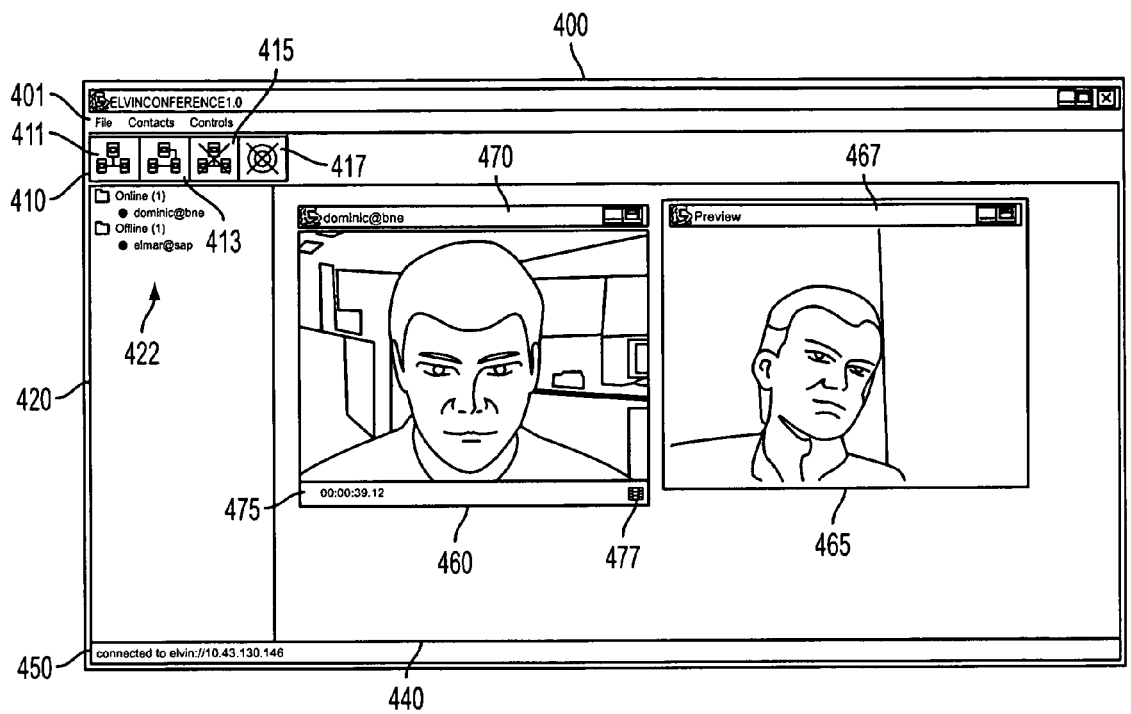
FIG. 4 is an exemplary graphical user interface for use with the conference system of FIG. 1.

FIG. 4 shows an exemplary conference system graphical user interface 400. The graphical user interface 400 may include a menu bar 401, a virtual button bar 410, a contact list window 420, a conference area 440, and a status bar 450.

A user may use the menu bar 401 to access dropdown menus. The dropdown menus may be used to select CBM conference options, CBM conference user management features, and to set up and control the CBM conference user interface and its features.

The virtual button bar 410 may include for example four virtual buttons: button 411 to create a CBM conference with a contact selected from the contacts list 422, button 413 to join a CBM conference already in progress, button 415 to leave a conference, and button 417 to display a preview window. The virtual buttons may be selected using an input device (e.g. a mouse) of the client device 110 to invoke their associated functions.

The contact list window 420 includes a list of user contacts 422 (e.g., users of the conference system 100 with whom a user communicates or monitors their status). The contact list 422 includes one or more identifiers (e.g., screen names or e-mail addresses) associated with users of the conference system 100. The current status of the contacts included in the contact list 422 may be determined by viewing a visual identification associated with a corresponding user identifier.

In one implementation, the status is indicated by the color of a bubble contact identifier associated with each identifier. For example, red may be used to indicate that a contact is offline, green may be used to indicate that a contact is online and not in a conference, and blue may be used to indicate that a contact is online and in a conference.

The contact list window 420 may use folders to organize groups of contacts. For example, the folders may group users by their current status, and as shown include a folder for online contacts and a folder for offline contacts.

The conference area 440 may be used to present information about ongoing conferences including data streams corresponding to multimedia data streams of each conference participant. The conference area 440 may include one or more conference windows (e.g., 460) that present the audio/video representations corresponding to the conference participants. In addition, a monitor window 465 may be displayed to preview and control the data stream sent to other client devices 110 during a conference.

Each conference window 460 may include a title bar 470 containing an identifier of a corresponding conference participant (e.g., dominic@bne). The conference window 465 also includes a status bar 475 at the bottom indicating the time an associated participant has been engaged in a conference. A small icon or other indication 477 (e.g., a "film" symbol) may be selected to obtain detailed information (e.g., data-rates, frame-rates, encoding of the current data stream, and a current time-stamp) about the audio/video stream that is presented in the corresponding conference window.

The monitoring window 465 may include a title bar 467 (e.g., preview). The monitoring window 465 does not include a status bar because the data presented in the window is generated locally and not by the JMF. The monitoring window 465 may be used to control the data stream published by the client device 110 associated with the monitoring window 465 that is sent to the conference participants.

The status bar 450 indicates information about the conference system 100. For example, the status bar 450 may include an indication that the client device 110 corresponding to the user interface 400 is connected to the CBM network 120. The status bar 450 also may indicate information regarding memory consumption of the corresponding client device 110.

Creating a Conference

To create a conference, a user may select a contact from their contact list 422. The user then selects the "create conference" virtual button 411 in the virtual button bar 410 to start the conference process.

Figure 5:
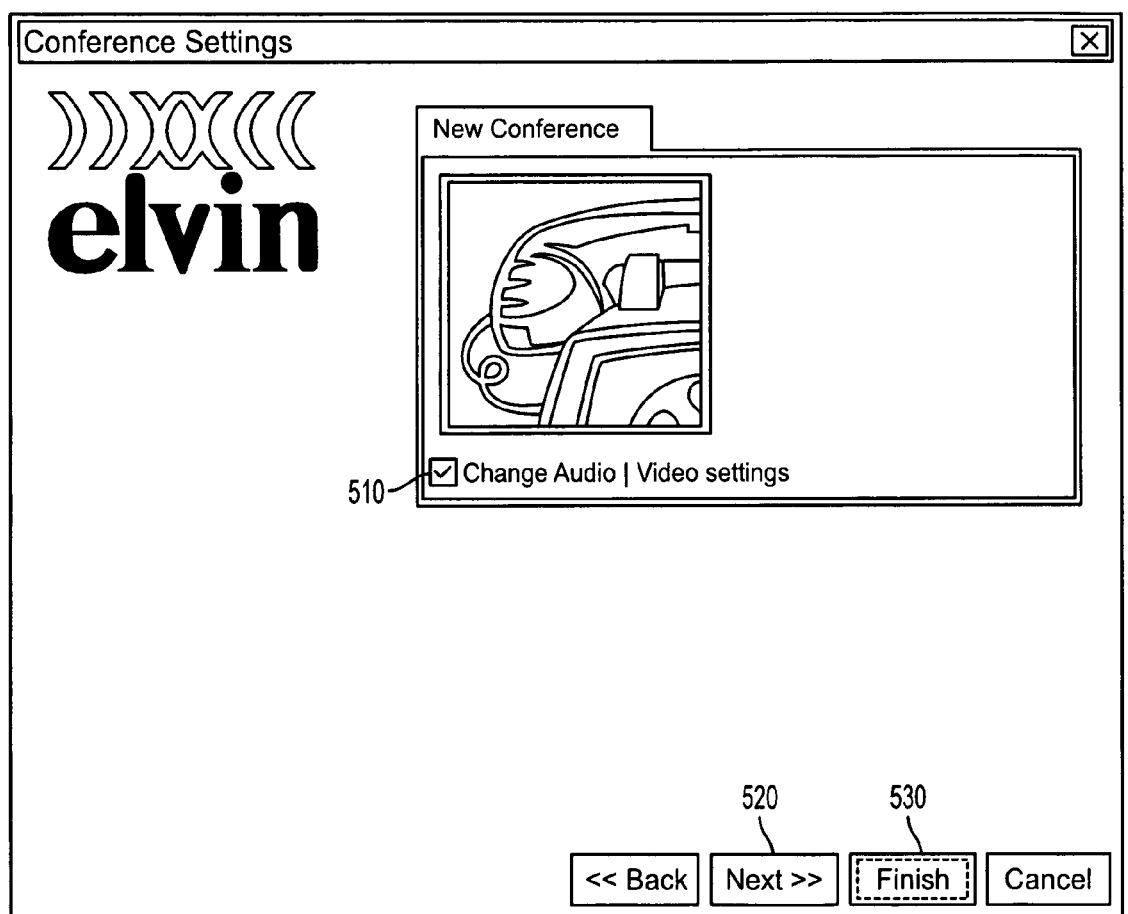
FIGS. 5, 6, 7, 8, and 9 are exemplary graphical user interfaces for establishing a conference.

In response, the graphical interface 500 as shown in FIG. 5 may be launched and used to configure the user interface/conference settings. If a change is desired, a change setting input 510 may be selected and a virtual button 520 may be selected to continue the process. If not, a conference is set up using the settings used in a previous conference and the virtual button 530 (e.g., Finish) may be selected.

Figure 6:
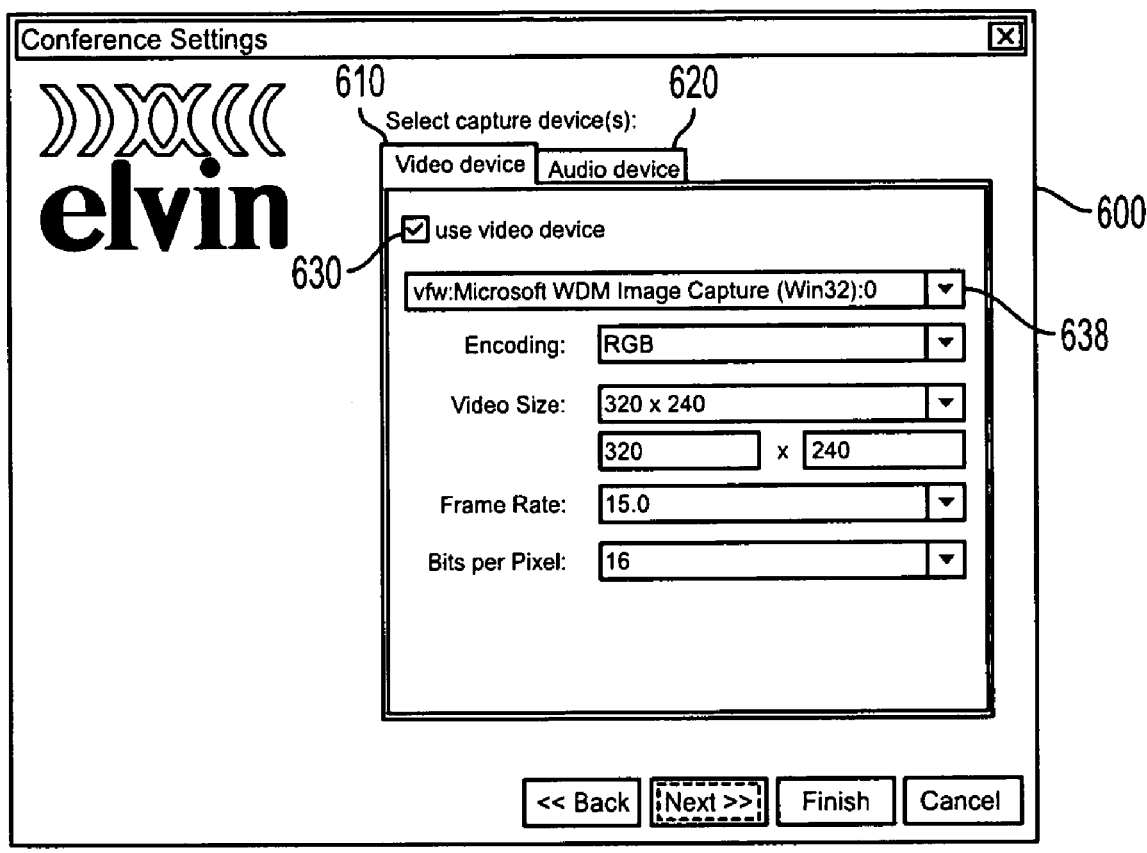
Figure 7:
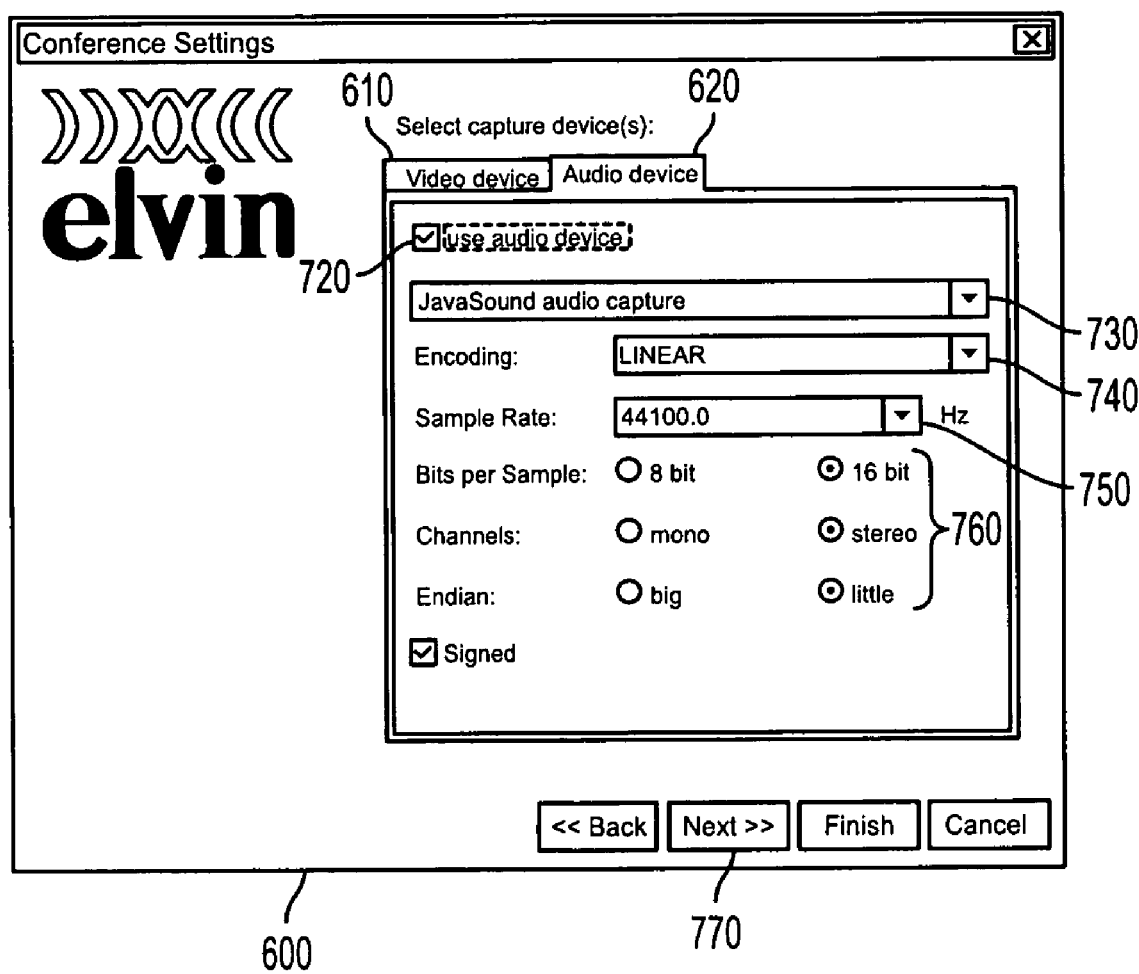

FIGS. 6 and 7 show exemplary graphical user interfaces that may be used to select options and to change the user interface settings (e.g., used by the JMF). As shown in FIG. 6, the interface 600 allows a user to select data capture devices associated with the client device 110 that may be used to conduct a CBM audio/video conference. A tab may be associated with each data capture device. For example, a video device tab 610 and an audio device tab 620 are provided to select and set up settings for each corresponding audio and video data capture device.

A video device tab 610 may include a selection input box 630 to activate the video device for which settings have been selected (or default settings provided by the CBM system 100). A type of video device may be selected from a drop down menu 638. Selections for encoding, video size, frame rate, and bits per pixel also may be selected using drop down menus. For example, a frame rate between 5 and 10 Frames/sec may be selected using the interface. Using the video tab 620, the video size may be reduced to provide better video quality. A video encoding scheme, such as Video for Windows (i.e., "vfw: . . . ") may be selected. Virtual buttons to finish or proceed to other screens also may be provided.

Similarly, as shown in FIG. 7, the Audio device tab 620 may be used to select audio device settings. A selection box 720 may be used to enable the audio device. Dropdown menus 730, 740, and 750 may be used to select a driver (e.g., Java Sound audio capture), encoding, and sample rate, respectively. Radio buttons 760 for bits per sample (e.g., 8 bit or 16 bit), channels (e.g., mono or stereo), endian (e.g., big or little) may be selected.

Figure 8:
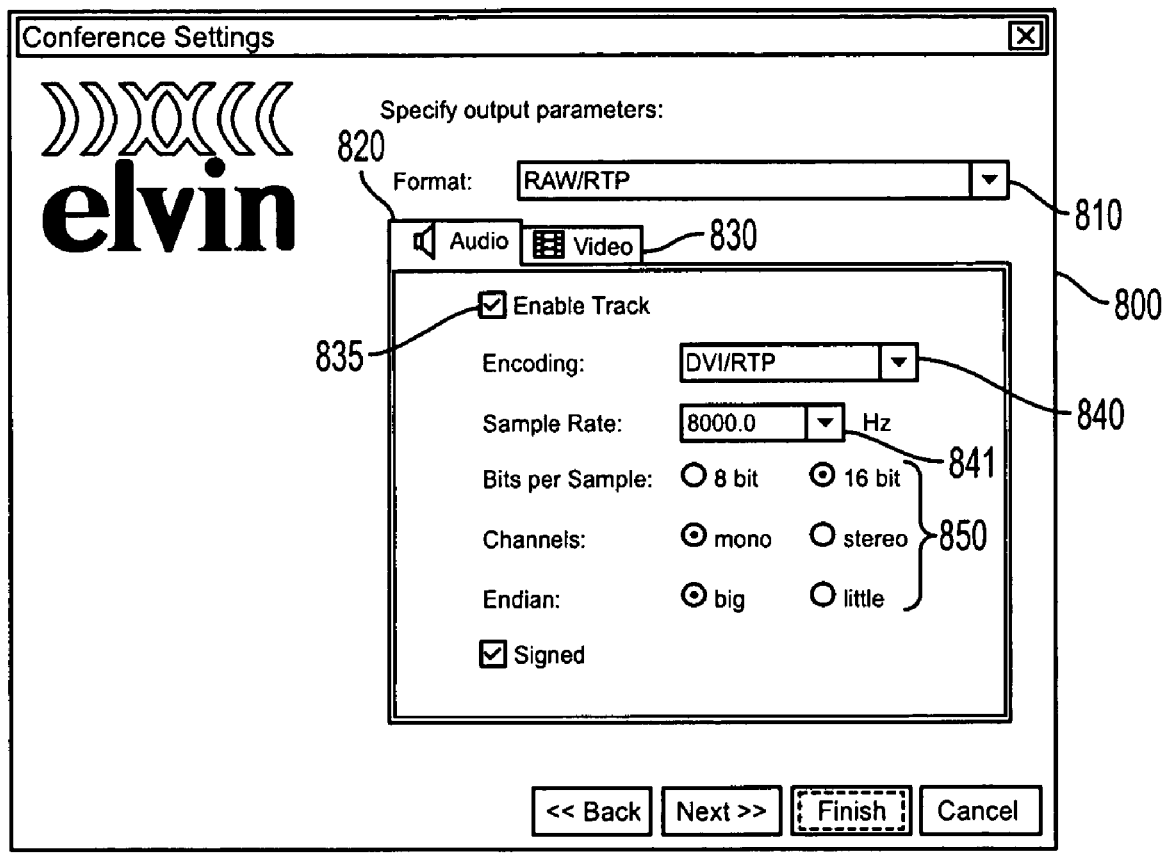
Figure 9:
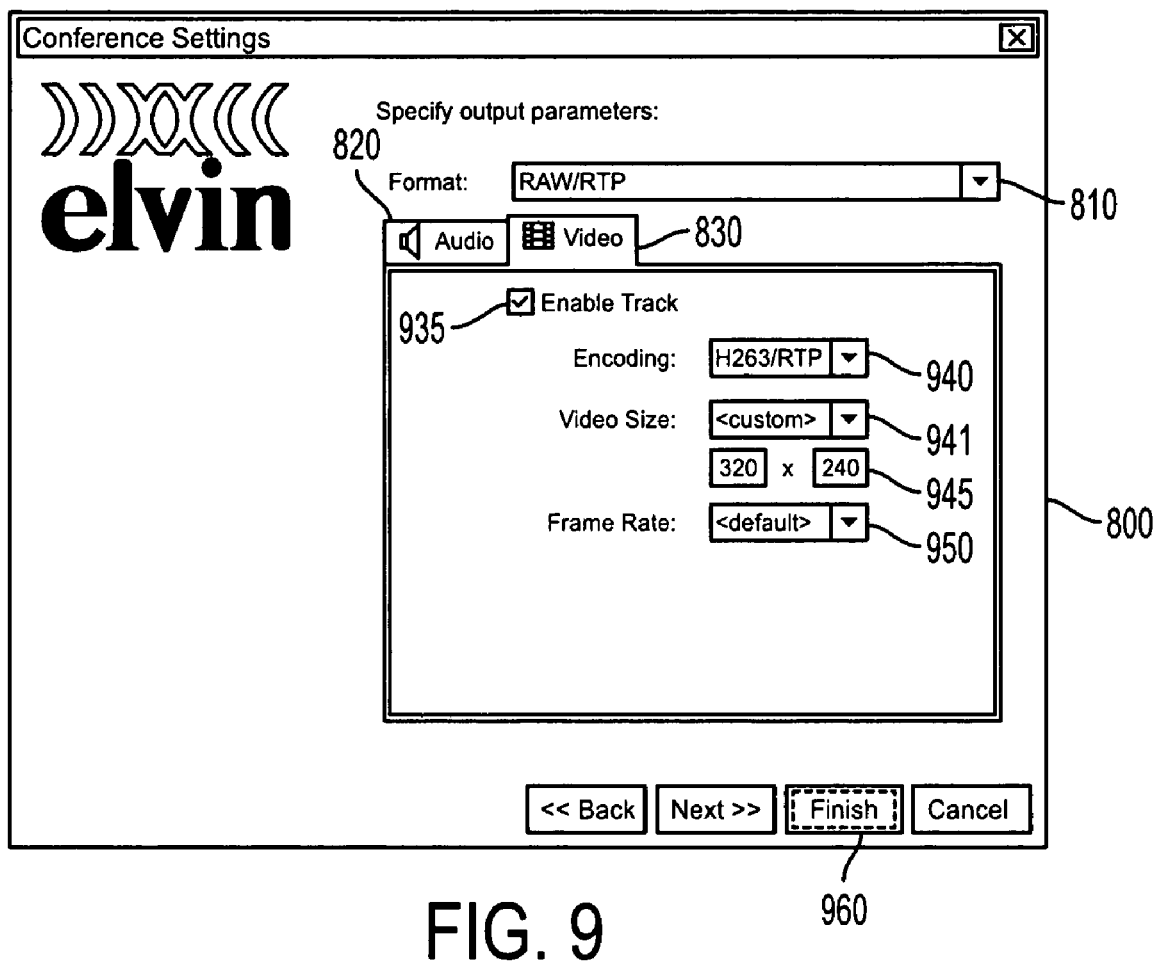
Figure 10:
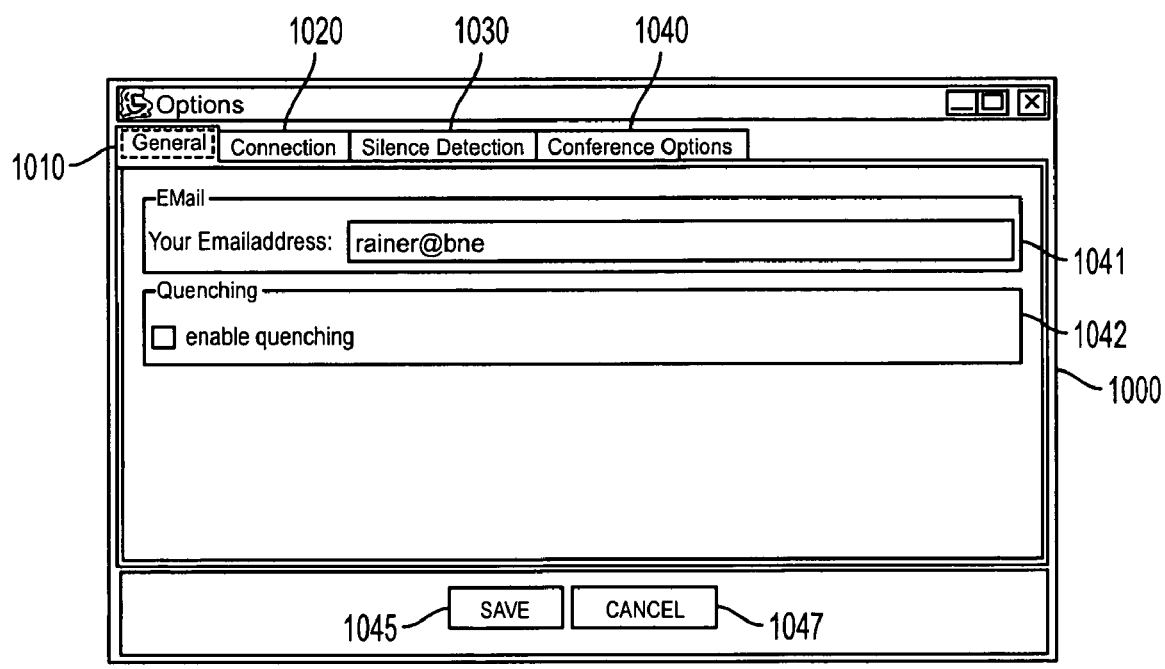
FIGS. 10, 11, 12, and 13 are exemplary graphical user interfaces for selecting options for a conference.

After clicking the Next button 770, a screen 800, as shown in FIGS. 8 and 9, for specifying the output parameters appears. A drop down menu 810 may be used to select a format (e.g., RAW/RTP). Tabs 820 and 830 specify output parameters for audio and video, respectively. For example, drop down menus 840 and 841 may be used to specify encoding and sample rate. Radio buttons 850 for bits per sample (e.g., 8 bit or 16 bit), channels (e.g., mono or stereo), endian (e.g., big or little) also may be selected.

As shown in FIG. 9, output parameters for video data associated with tab 830 may be selected. A select box 935 may be used to enable a track. Dropdown menus 940, 941, 945, and 950 may be used to select encoding, video size, and frame rate, respectively. A Finish button 960 may be used to finalize the parameters and setup process.

After this process is finished for the initiator of the conference, an invitation to the conference is sent to an invited user (previously selected using the contact list as described above). When connecting to the CBM network 120, the CBM adaptation layer 230 registers a subscription to an identifier associated with its user interface. This process allows any published invitation to be sent by the CBM network 120 to be sent to the subscribing user interface. The invited user can then accept or reject the invitation. If the invitation is accepted, the invited user may proceed through the same process of configuring the data streams as described above for the conference initiator, and register a subscription for the conference messages. After all configurations have been selected, the CBM conference may begin.

Installation

Before a conference may be set up, the client devices 110 must install the necessary software and drivers (e.g., the camera and associated drivers, a microphone and associated drivers, Java (e.g., 1.3 or 1.4) and JMF (e.g., JMF 2.1)). After installing the JMF, the user may run the JMF registry (a tool provided by the JMF to register the audio and video capture devices associated with the user interface) from a programs menu of the operating system. The JMF also may be used to register and detect any data capture devices and to make the data capture devices available to the JMF and any applications using the JMF. Registration is necessary after installation of the JMF and after making any changes to the audio and video configurations.

To run a CBM conference, the client device 110 also must access to the CBM network 120 and register any subscriptions (conference data or user status data). The CBM network 120 includes one or more CBM servers and several client devices 110 (e.g., that may be producers or consumers). For a client device 110 to gain access to the CBM network 120 a client library is used. The client library is programming language and platform dependent. In this implementation, a client library is provided by Elvin. The client library provides the runtime support for applications using Elvin. The client library encapsulates the wire-level protocol understood by the server using classes or functions in a style appropriate to the specific language (in this case Java).

FIGS. 10, 11, 12, and 13 show an options graphical user interface 1000 that may be used to configure options of the conference application. The interface 1000 may include several tabs to configure the conference application. For example, a general tab 1010, a connection tab 1020, a silence detection tab 1030, and a conference options tab 1040 may be provided. Virtual buttons save 1045 and cancel 1047 may be used to save or cancel option settings, respectively.

The general tab 1010 may include a field to insert a user identifier (e.g., an e-mail address, a screen name, or another system identifier). The identifier is used to identify a user on the CBM network 120 and also is used in the contact list of other users to identify the user (e.g., to initiate a conference or to determine a user status). A selection box 1042 is also provided to enable the quenching feature.

Figure 11:
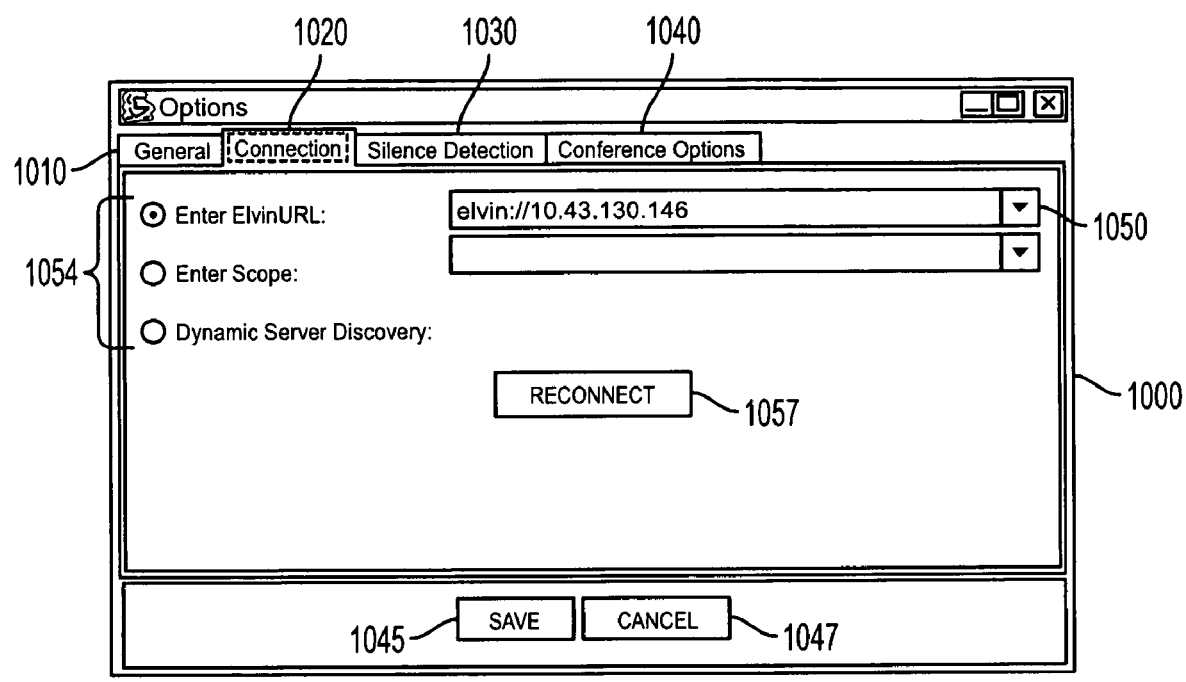

Referring to FIG. 11 the connection tab 1020 may be used to specify a CBM network server. In one implementation, the URL of the server may be selected from a dropdown menu 1050. Radio button selections 1054 may be used to indicate whether a server is selected from the dropdown menu, if the server is entered manually (e.g., a desired server's URL is typed in), or if the server is to be automatically detected. Once the server is selected, a virtual button 1057 may be selected to check the connection of the client device 110 to the selected conference server. The user is then informed about successful and unsuccessful attempts to connect in the status bar of the main window.

Figure 12:
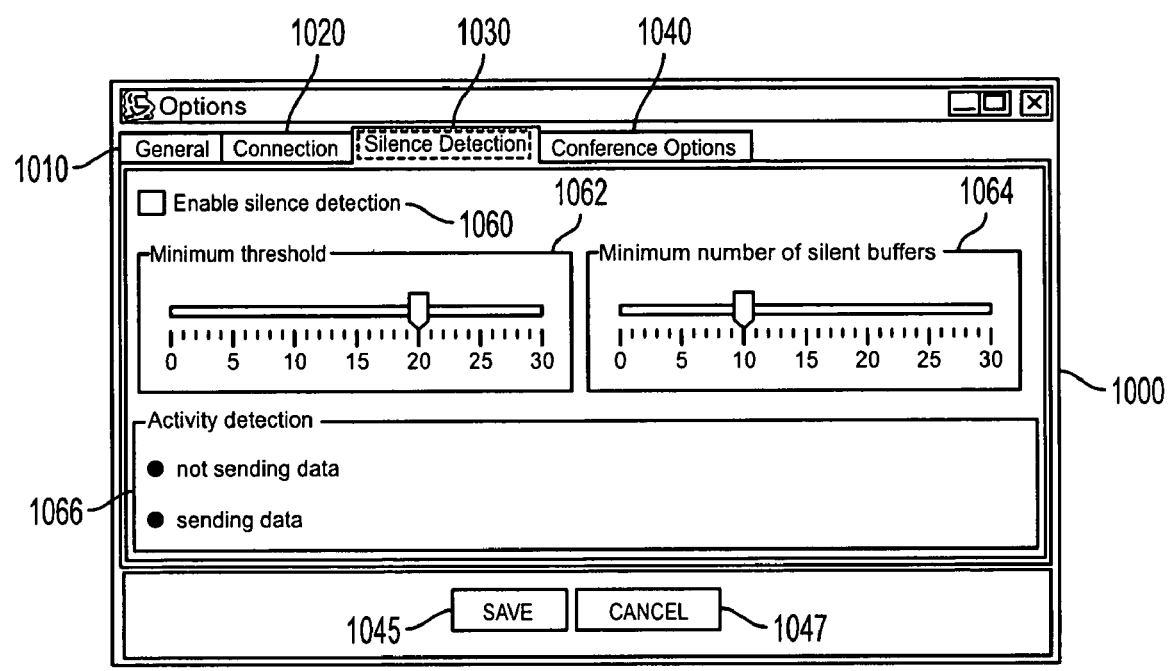

As shown in FIG. 12 the silence detection tab 1030 may be used to select silence detection. Silence detection is used to reduce the required bandwidth. For example, data may be transmitted only when the user is talking. If silence detection is enabled, no data is sent to the other conference participants if the sound level is below a given threshold. A selection box 1060 may be use to enable the silence detection. Sliding scales 1062 and 1064 may be used to establish the minimum threshold and number of silent buffers respectively. The silent buffers specify the time of continuing silence (input gain below the threshold) before the system stops sending data. This means that after the input gain is below the threshold for some time (e.g., in milliseconds), transmitting of data is stopped. In addition, a screen area 1066 is provided to display activity detection of a user.

Figure 13:
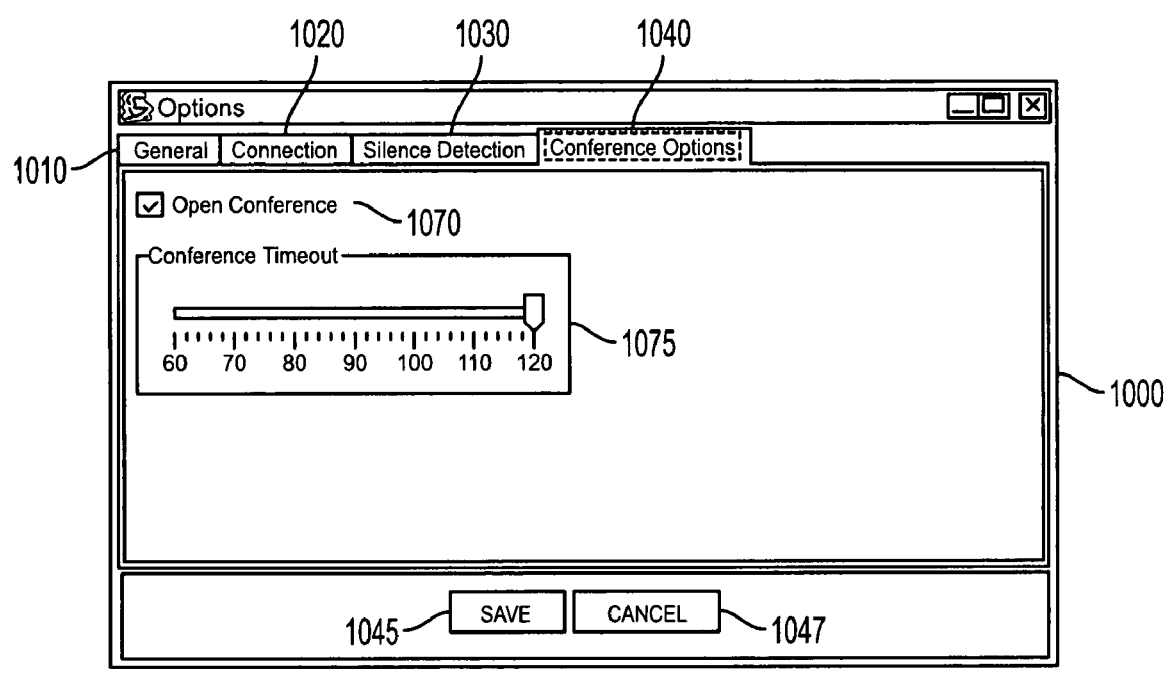

In FIG. 13 conference options tab 1040 may be used to select the initial timeout that the conference interface waits for participants to reply to an invitation. A selection box 1070 may be used to select an open conference, in which any user of the CBM network may participate in the conference and/or the administration of the conference. A selection scale 1075 may be used to specify a conference time.

A number of exemplary implementations have been described. Nevertheless, it is understood that various modifications may be made. For example, suitable results may be achieved if the steps of the disclosed techniques are performed in a different order and/or if components in a disclosed architecture, device, or circuit are combined in a different manner and/or replaced or supplemented by other components. Accordingly, other implementations are within the scope of the following claims.

What is claimed is:

1. A computer-implemented method comprising:
assigning users to a set of users that exchange status messages with one another;
registering subscriptions for a conference data stream with a content based messaging (CBM) network to define a sub-set of users of the set of users, the sub-set of users including fewer users than the set of users;
presenting the status messages to every user of the set of users;
generating input data using an input device;
publishing the input data as a conference message that is only received by users of the sub-set of users via the conference data stream;
determining if any users of the sub-set of users are subscribed to the conference data stream;
halting publishing of the conference message via the conference data stream, if it is determined that no users of the sub-set of users are subscribed to the conference data stream;
receiving information that users of the sub-set of users have subscribed to the conference data stream; and
restarting publishing of the conference message that is only received by users of the sub-set of users via the conference data stream based on receiving the information.

2. The method of claim 1 wherein the conference message includes video data.

3. The method of claim 1 wherein the conference message includes audio data.

4. The method of claim 1 wherein the conference message includes audio and video data.

5. The method of claim 1 further comprising assembling received messages into streaming video data and presenting the streaming video data only to users of the sub-set of users.

6. The method of claim 1 further comprising assembling received messages into streaming audio data and presenting the streaming audio data only to users of the sub-set of users.

7. The method of claim 1 further comprising assembling received messages into streaming audio and video data and presenting the streaming audio and video data only to users of the sub-set of users.

8. The method of claim 1 further comprising converting received messages from a real time transport protocol to a format required by the Java Media Framework (JMF) to present streaming audio and/or video data only to users of the sub-set of users.

9. The method of claim 1 further comprising initiating a conference by inviting a user connected to the CBM network to join the conference.

10. The method of claim 1 further comprising initiating a conference by inviting one or more users connected to the CBM network to join the conference and subscribing to the conference data stream of a content based messaging CBM network associated with each user.

11. The method of claim 10 wherein initiating a conference by inviting one or more users connected to the CBM network to join the conference further comprises selecting the one or more users from a contact list of identifiers associated with each user.

12. The method of claim 11 further comprising publishing a status of each user to the CBM network.

13. A system comprising:
a user interface configured to:
present status messages to a user every user of a set of users,
generate input data; and
a messaging infrastructure configured to:
assign users to the set of users, the set of users exchanging status messages with one another;
register subscriptions for a conference data stream with a content based messaging (CBM) network to define a sub-set of users of the set of users, the sub-set of users including fewer users than the set of users,
publish the input data as a conference message that is only received by users of the sub-set of users via the conference data stream,
determine if any users of the sub-set of users are subscribed to the conference data stream,
halt publishing of the conference message via the conference data stream, if it is determined that no users of the sub-set of users are subscribed to the conference data stream,
receive information that users of the sub-set of users have subscribed to the conference data stream, and
restart publishing of the conference message that is only received by users of the sub-set of users via the conference data stream based on receiving the information.

14. The system of claim 13 wherein the conference messages include one of video data, audio data, or a combination of video and audio data.

15. The system of claim 13 further comprising two or more client devices configured to generate the subscriptions and to receive the conference messages and present the conference messages to a user of the sub-set of users.

16. The system of claim 15 wherein each client device is configured to assemble the received messages into streaming video data and to present the streaming video data to the user of the sub-set of users.

17. The system of claim 15 wherein each client device is configured to assemble the received messages into streaming audio data and to present the streaming audio data to the user of the sub-set of users.

18. The system of claim 15 wherein each client device is configured to assemble the received messages into streaming audio and video data and to present the streaming audio and video data to the user of the sub-set of users.

19. The system of claim 15 wherein each client device is configured to convert the received conference messages from a real time transport protocol to a format required by the Java Media Framework (JMF) to present streaming audio and video data to the user of the sub-set of users.

20. The system of claim 15 wherein each client device is configured to receive an invitation to join the conference and to subscribe to a conference data stream of a content based messaging (CBM) network associated with each user of the sub-set of users.

21. A computer program products, tangibly embodied in a machine readable medium, the computer program product comprising instructions that, when read by a machine, operate to cause a data processing apparatus to cause a processor to:
assign users to the set of users, the set of users exchanging status messages with one another;
register subscriptions for a conference data stream with a content based messaging (CBM) network to define a sub-set of users of the set of users, the sub-set of users including fewer users than the set of users;
present the status messages to every user of the set of users;
generate input data using an input device;
publish the input data as a conference message that is only received by users of the sub-set of users via the conference data stream;
determine if any users of the sub-set of users are subscribed to the conference data stream;
halt publishing of the conference message via the conference data stream, if it is determined that no users of the sub-set of users are subscribed to the conference data stream;
receive information that users of the sub-set of users have subscribed to the conference data stream; and
restart publishing of the conference message that is only received by users of the sub-set of users via the conference data stream based on receiving the information.

22. The computer program product of claim 21 wherein the conference messages include video or audio data.

23. The computer program product of claim 21 further comprising instructions to assemble the received conference messages into streaming video data for presentation to a user of the sub-set of users.

24. The computer program product of claim 21 further comprising instructions to assemble the received conference messages into streaming audio data for presentation to a user of the sub-set of users.

25. The computer program product of claim 21 further comprising instructions to assemble the received conference messages into streaming audio and video data for presentation to a user of the sub-set of users.

26. The computer program product of claim 21 further comprising instructions to convert received conference messages from a real time transport protocol to a format required by the Java Media Framework (JMF) to present streaming audio and/or video data to a user of the sub-set of users.

27. The computer program product of claim 21 further comprising instructions to initiate a conference by inviting a user connected to the CBM network to join the conference.

28. The computer program product of claim 27 further comprising instructions to subscribe to a conference data stream of a content based messaging CBM network associated with each user of the sub-set of users.

29. The computer program product of claim 21 further comprising instructions to publish conference messages associated with the conference to the CBM network.

* * * * *